(No Model.)

A. FEATHERSTONE.
ADJUSTING DEVICE FOR CHAIN WHEELS OF BICYCLES.

No. 504,870. Patented Sept. 12, 1893.

Witnesses
W. C. Corlies
A. M. Best

Inventor:
Alfred Featherstone
By Cobern & Thacher
Att'ys

ALFRED FEATHERSTONE, OF CHICAGO, ILLINOIS.

ADJUSTING DEVICE FOR CHAIN-WHEELS OF BICYCLES.

SPECIFICATION forming part of Letters Patent No. 504,870, dated September 12, 1893.

Application filed January 9, 1891. Serial No. 377,240. (No model.)

*To all whom it may concern:*

Be it known that I, ALFRED FEATHERSTONE, a citizen of the United States, residing at Chicago, in the county of Cook and State of Illinois, have invented certain new and useful Improvements in Adjusting Devices for Chain-Wheels of Bicycles, which are fully set forth in the following specification, reference being had to the accompanying drawings, in which—

Figure 1:
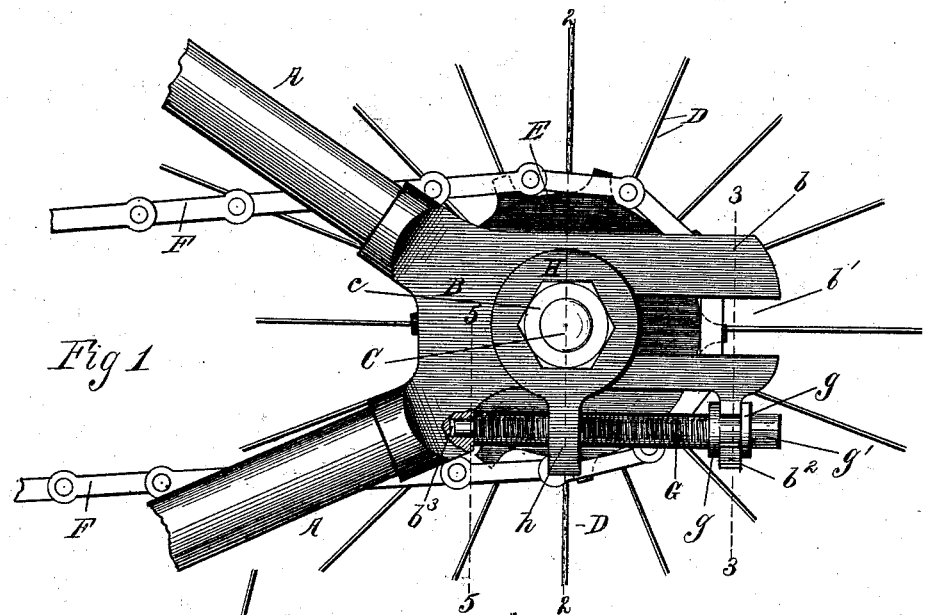
Figure 2:
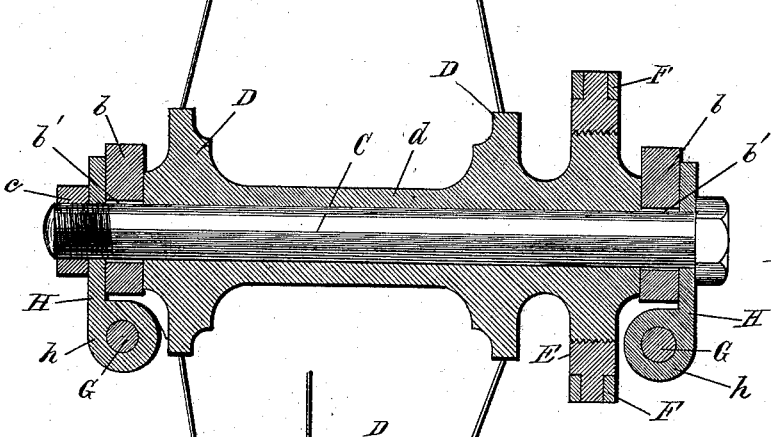
Figure 3:
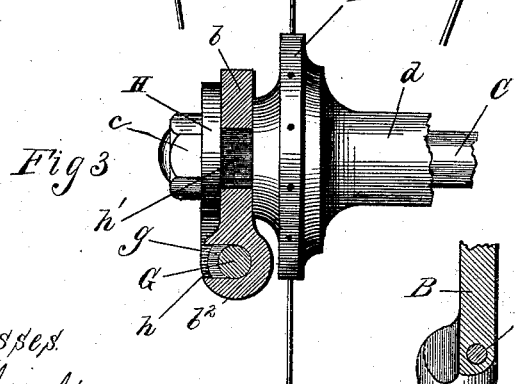
Figure 4:
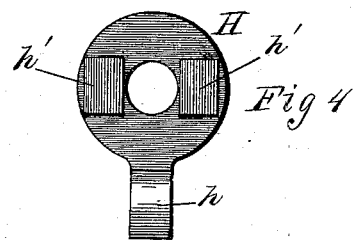
Figure 5:
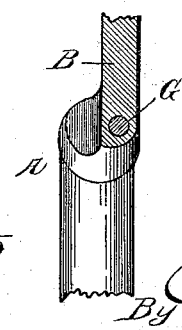

Figure 1 represents a side elevation of a portion of the rear wheel of a bicycle and its bearings; Fig. 2, a section of the same, taken on the line 2, 2, of Fig. 1; Fig. 3, a detail section, taken on the line 3, 3, of Fig. 1; Fig. 4, an inside elevation of the hinged washer, detached; and Fig. 5, a detail section, taken on the line 5, 5, of Fig. 1.

My invention relates to bicycles in which drive chains are employed, this type of "wheel" being generally known as the safety bicycle.

The invention relates to devices for adjusting one of the chain wheels, so that the tension of the drive chain may be easily regulated, either to keep it taut for driving, or slacked for removal, as occasion may require.

I will proceed to describe in detail the construction and operation of the devices whereby I have carried out my invention in a practical way and will then point out more definitely in the claim the particular improvements which I believe to be new and wish to secure by Letters Patent.

It is not necessary to show and describe an entire bicycle for the purpose of illustrating the invention; hence I have only shown a part of the rear wheel of an ordinary safety bicycle with its support, driving devices and my improved adjusting devices, the adjustment of the tension on the drive chain being usually effected by adjusting the axle of this rear wheel.

In the drawings, A represents the rear portion of the bicycle frame of any ordinary construction, which frame terminates at the rear with the usual fork, B, in which the rear wheel is mounted. Each arm, $b$, of this fork is provided with a slot, $b'$, cut inward from the rear. The axle, C, of the rear wheel, D, is mounted in these slots, so as to be movable back and forth therein. The wheel D is of any ordinary construction, its hub, $d$, being loose on the axle and carrying a chain wheel, F, either integral with or fastened to it. The drive chain, F, is applied to this chain wheel in the usual manner. The lower member of each slotted arm $b$ is provided at its rear end with a short depending lug, $b^2$, which is perforated and preferably open at one side, as seen in Fig. 1. In this lug is mounted one end of a screw, G, the other or forward end of which is set into a shallow socket or recess, $b^3$, bored into the fork, as seen in Fig. 1 and thus forming a bearing for this end of the screw; this end of the screw is preferably cut down for the socket bearing, as seen in said figure. Near the outer end of this screw there are collars, $g$, set apart, so as to embrace the depending lug $b^2$ when the screw is mounted therein; hence it will be seen that the screw may be turned without horizontal movement and to provide for this it may be made with a suitable angular head, $g'$, at its extremity to which a small wrench may be applied. Each end of the wheel axle is mounted in a washer, H, and each washer is provided with a depending ear or lug, $h$, which is perforated and threaded, so as to be applied to one of the screws G. The turning of the screws will therefore, set the respective washers back and forth according to the direction in which the screws are turned and the axle being mounted in the washers will, of course, be adjusted with them and so the tension of the drive chain regulated as desired by the adjustment of the chain wheel E with the axle. The inner faces of the washers H are preferably provided with short lugs, $h'$, which are adapted to enter the slots in the fork arms, thereby preventing any twisting or turning of the washers. The wheel axle is secured in any adjustment by a nut, $c$, turned on one end threaded for this purpose, the other end of the latter being provided with an ordinary head. For adjustment the nut is loosened, so that the parts may be free to move and it is evident that if the nut be removed entirely, the axle may be withdrawn and the parts separated. The side opening in the bearing lug $b^2$ permits the adjusting screw to be readily placed in position, or removed therefrom.

Changes may be made in details of construction and arrangement of the devices without materially changing the nature of the improvement and, therefore, I do not wish to be understood as limiting the invention to all the precise details herein described and shown.

Having thus described my invention, what I claim as new, and desire to secure by Letters Patent, is—

In a bicycle, the fork arms $b$, provided with slots $b'$, in combination with the chain drive wheel axle C mounted in said slotted arms, the washers H on the respective nuts of the axle and provided with threaded lugs $h$, and inside face lugs $h'$, and adjusting screws G running in the threaded lugs of the washers and thereby causing the latter to travel, substantially as and for the purposes specified.

ALFRED FEATHERSTONE.

Witnesses:
CARRIE FEIGEL,
A. M. BEST.